Figure 1:
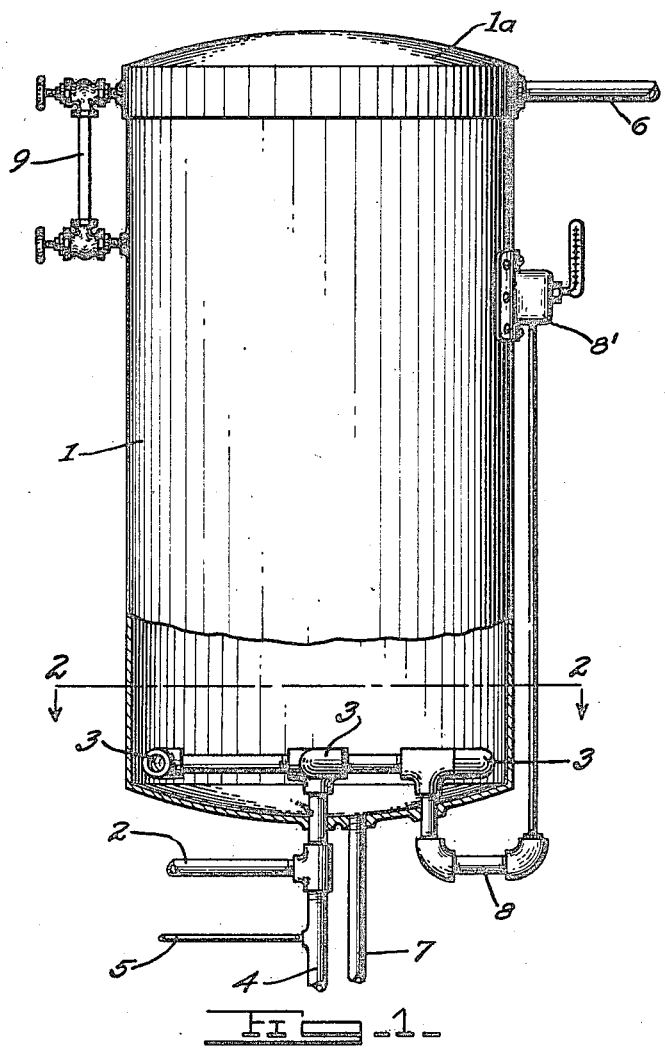
Figure 2:
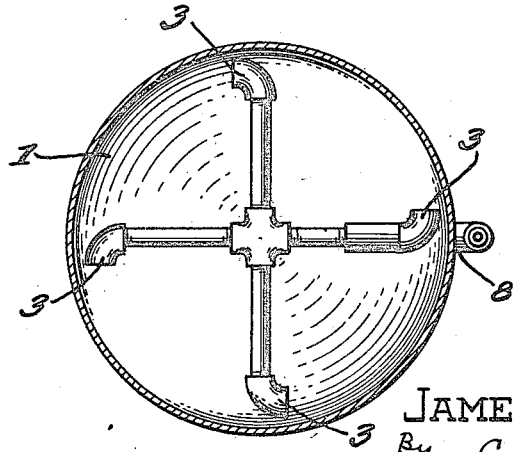

April 9, 1929.　　　J. W. PARCELL　　　1,708,105

PROCESS OF STERILIZING FOOD PRODUCTS

Filed July 13, 1927

INVENTOR
JAMES W. PARCELL
By C. W. Boyle

ATTORNEYS

Patented Apr. 9, 1929.

1,708,105

UNITED STATES PATENT OFFICE.

JAMES W. PARCELL, OF SAN FRANCISCO, CALIFORNIA, DEDICATED, BY MESNE ASSIGNMENTS, TO THE CITIZENS OF THE UNITED STATES.

PROCESS OF STERILIZING FOOD PRODUCTS.

Application filed July 13, 1927. Serial No. 205,526.

(GRANTED UNDER THE ACT OF MARCH 3, 1883, 22 STAT. L. 625.)

This application is made under act of March 3, 1883, chapter 143 (22 Stat. 625), and the invention herein described and claimed may be used by the Government of the United States, or any of its officers or employees in the prosecution of work for the Government, or any person in the United States, without payment to me of any royalty thereon.

My invention relates to a process of operating sterilizers and pressure cookers used in the sterilizing and cooking of food products in tin or glass containers. The process heretofore used is subject to the following defects:

1. It gives poor circulation of the heating medium.
2. It does not give a uniform temperature throughout the heating medium.
3. The desired temperature and pressure are maintained with difficulty.
4. Heating is accompanied by much troublesome vibration and undue noise.
5. Cooling after sterilizing or cooking is difficult and not uniform and also likely to result in excessive breakage of glass containers.
6. Because of variations in pressure and temperature, many of the lids of the glass containers come off the jars causing loss of the contents.

My process eliminates the aforementioned defects and the advantages of my process are as follows:

1. It permits through agitation of the heated water or other liquid in the sterilizer or cooker.
2. It permits rapid and uniform heating of the heating medium (water or other liquid) in the sterilizer or cooker at atmospheric pressures or at pressures greater than or less than atmospheric pressure.
3. It permits maintenance of accurate and uniform temperatures of the heating medium (water or other liquid) in the sterilizer or cooker at pressures equal to, greater than or less than atmospheric pressure.
4. It permits rapid and uniform heating of the containers, and their contents, in the sterilizer or cooker.
5. It permits rapid and uniform cooling of the water or other liquid in the sterilizer or cooker.
6. It permits rapid and uniform cooling of the containers, and their contents, in the sterilizer or cooker.
7. It permits accurate control of the pressure in the sterilizer or cooker.
8. It permits accurate and dependable operation when a variable pressure is maintained in the sterilizer or cooker.
9. It permits accurate and dependable operation when a constant pressure is maintained in the sterilizer or cooker.
10. It permits addition of water into the sterilizer or cooker during operation to maintain a sufficiently high water level without impairing appreciably the uniformity of temperature and pressure in the sterilizer or cooker or in the food containers.
11. It permits accurate and uniform control of the temperature in the containers of food being sterilized or cooked.
12. It reduces vibration to a minimum.
13. It permits very quiet operation.
14. It is simple in installation and in operation.
15. It may be controlled by hand or by automatic instruments or a combination of the two.
16. It is easily operated and lightens the labor of the attendant.

The accompanying drawing illustrates diagrammatically a type of apparatus to be used in the practice of my process.

In the drawing 1 indicates a tank, with lid 1ª, into which tank the receptacles containing the food to be treated are placed. Water, brine or other liquid is introduced into the tank by feed pipe 2 and distributer pipes 3 connecting therewith and so disposed within the tank as to create a whirling motion to the liquid as it enters the tank. Steam pipe 4 connects with feed pipe 2 and affords means for heating the liquid that enters tank 1. Connecting with steam pipe 4 is another pipe 5 which provides an air inlet to the tank. Adjacent to the top of the tank is an overflow pipe 6 and at the bottom of said tank is a drain pipe 7. Pipes 2, 4 and 5 and drain 7 are equipped with valves not shown. 8 represents a thermometer pocket circulator system.

*Description of process.*

Briefly described my process consists in heating tin or glass containers of food in water or other liquid medium, such as brine, etc., the water or other liquid medium being heated by steam flowing from jets or nozzles so arranged as to produce a whirling, spiral, or vertical movement of the water or other medium, which causes circulation and agitation of the heating medium. Air may be admitted with the steam or adjacent to the steam to agitate the heating medium to reduce vibration and noise, or to maintain a pressure above that of the vapor pressure of the heated water, or for all of the purposes mentioned. The nozzles or jets for steam delivery may be equipped with devices to improve circulation of the heating medium and reduce vibration and noise.

An important feature of my process consists in connecting the thermometer or temperature control bulb housing or pocket to the agitating or circulating device so that circulation of the heating medium is maintained about the bulbs of the instruments.

Another feature of my process consists in adding water as needed to the sterilizer or cooker with the steam so that it is heated before it enters the sterilizer or cooker and thus does not reduce appreciably the temperature therein.

Still another feature of my process consists in installing a glass water gauge 9 on the side of the sterilizer or cooker to indicate the water level in the sterilizer or cooker.

In my process, the water used in cooling after sterilization or cooking is introduced with steam and is so tempered that a gradual and not a sudden reduction in temperature results. This water for cooling may be introduced through the agitating or circulating device previously described with the object of agitating or circulating the water within the sterilizer or cooker while cooling is taking place. This method of introducing the cooling water permits more uniform cooling of the sterilizer or cooker and of the containers of food, and also permits more rapid cooling of the sterilizer or cooker and the containers of food therein.

Having thus described my invention, I claim:

A process of sterilizing food products in sealed receptacles, consisting in submerging the receptacles in water in a container, in introducing steam to the water to heat the same and to impart thereto a whirling motion, in introducing air to the container to maintain a pressure above that of the vapor pressure of the heated water in said container and to cause further agitation of the water, and finally in gradually reducing the temperature of the water in said container by the addition thereto of a mixture of cold water and steam, the steam being introduced in diminishing amount as the cooling operation proceeds.

JAMES W. PARCELL.